(12) United States Patent
Yamaguchi (10) Patent No.: US 8,025,262 B2
(45) Date of Patent: Sep. 27, 2011

(54) TRIPOD ASSEMBLY

(75) Inventor: Minoru Yamaguchi, Saitama (JP)

(73) Assignee: Heiwa Seiki Kogyo Co., Ltd., Saitama (JP)

( * ) Notice: Subject to any disclaimer, the term of this patent is extended or adjusted under 35 U.S.C. 154(b) by 910 days.

(21) Appl. No.: 11/987,346

(22) Filed: Nov. 29, 2007

(65) Prior Publication Data

US 2008/0156947 A1 Jul. 3, 2008

(30) Foreign Application Priority Data

Dec. 27, 2006 (JP) ................................. 2006-353078

(51) Int. Cl.
*F16M 11/02* (2006.01)
(52) U.S. Cl. .................................. 248/181.2; 248/176.1
(58) Field of Classification Search ............... 248/181.1, 248/181.2, 176.1, 177.1, 178.1, 19.1
See application file for complete search history.

(56) References Cited

U.S. PATENT DOCUMENTS

| | | | | |
|---|---|---|---|---|
| 3,632,073 A | * | 1/1972 | Nakatani | 248/169 |
| 4,121,799 A | * | 10/1978 | Michio | 248/171 |
| 4,579,436 A | * | 4/1986 | Jaumann | 248/163.1 |
| 5,466,078 A | * | 11/1995 | Szmanda et al. | 400/489 |
| 7,047,960 B2 | * | 5/2006 | McCrea | 124/86 |
| 7,364,125 B2 | * | 4/2008 | Speggiorin | 248/181.1 |
| 2005/0151036 A1 | | 7/2005 | Speggiorin | |
| 2006/0000957 A1 | * | 1/2006 | Carnevali | 248/181.1 |
| 2007/0152115 A1 | * | 7/2007 | Chou | 248/181.1 |

FOREIGN PATENT DOCUMENTS

| | | |
|---|---|---|
| EP | 1 488 165 | 3/2006 |
| JP | 2005-521844 | 7/2005 |
| WO | 03/083351 | 10/2003 |

* cited by examiner

*Primary Examiner* — Terrell McKinnon
*Assistant Examiner* — Steven Marsh
(74) *Attorney, Agent, or Firm* — Wenderoth, Lind & Ponack, L.L.P.

(57) ABSTRACT

A collet portion including a cup-shaped collet is fixed to an upper end of a vertically movable body vertically movable relative to a connecting portion to which upper ends of the legs of a tripod assembly are pivotally coupled. The collet is flexible and is formed with plural slits extending radially. The collet receives a semispherical bowl leveler as making contact with a semispherical surface of the bowl leveler at a cup-shaped inside surface thereof. The bowl leveler is combined with the collet portion by means of a bolt and is free to tilt back/forth and sideways as guided by the collet. An upper end portion of the vertically movable body is provided with a collar at place outside the collet, the collar vertically movable relative to the vertically movable body. The collar includes an abutment portion on an inside surface thereof, the abutment portion capable of being abutted against an outside surface of the collet.

3 Claims, 8 Drawing Sheets

TRIPOD ASSEMBLY

BACKGROUND OF THE INVENTION

I. Field of the Invention

The present invention relates to a tripod assembly used for leveling of an imaging apparatus such as video cameras.

II. Background Art

In order to ensure stable panning and tilting of the imaging apparatus such as a video camera, it has been the general practice to use a level vial for adjusting the lengths of the legs of the tripod and performing the leveling of the imaging apparatus. Fine adjustment of the leg lengths is necessary for achieving an exact leveling of the imaging apparatus. In a case where a certain degree of leveling of the imaging apparatus is accomplished, it is cumbersome to adjust the lengths of the legs of the tripod each time a place to take picture is changed. In this connection, there is known a support such as disclosed in Published Japanese Translation of PCT Patent Application No. 2005-521844.

The support set forth in the above document is adapted to fix the imaging apparatus in a horizontal position independently of positioning of the tripod. The support comprises a pole/socket joint including a pole and a socket and disposed at an upper end portion of a pillar extending vertically. A tie rod for fixing the pole to the socket extends through the pillar and is operable by way of a knob disposed at a lower end portion of the pillar.

The above support is mounted on a base in a manner to be vertically movable relative to the base to which the upper ends of the legs of the tripod are pivotally coupled. The imaging apparatus is mounted on the pole via a fixing plate, a platform or the like, the pole being tilted relative to the socket so as to set the imaging apparatus in a horizontal position. Subsequently, the knob is manipulated to operate the tie rod for fixing the pole in position. Thus, the leveling of the imaging apparatus is accomplished. That is, the above support permits the leveling of the imaging apparatus to be performed independently of positioning of the tripod.

However, the knob for operating the tie rod is disposed at the lower end portion of the pillar, whereas the imaging apparatus is mounted to the pole disposed at the upper end portion of the pillar. Hence, an operation position to perform the operation of tilting the pole relative to the socket for setting the imaging apparatus to the horizontal position is at a different height from that of a position to perform the pole fixing operation. Further, the knob is located at a place downward from the base of the tripod. This forces a user performing the leveling operation to take improper postures. Accordingly, the leveling operation of the imaging apparatus is not always easy. In some cases, the user manipulating the knob may encounter an inadvertent pivotal motion of the pole caused by the weight or the like of the imaging apparatus set to the horizontal position. This leads to a problem that it takes much time and effort to achieve the exact leveling of the apparatus.

Furthermore, the tie rod and also a second pole/socket joint disposed at an upper end of the tie rod, in practice, are necessary for fixing the pole to the socket. Hence, all the supports may not have a simple structure, which reflects cost.

In view of the foregoing problems, the invention seeks to provide a low-cost tripod assembly facilitating the leveling operation of the imaging apparatus such as a video camera and having a simplified structure.

SUMMARY OF THE INVENTION

The tripod assembly according to the invention has the following aspects for solving the above problems.

In a first aspect of the invention, a tripod assembly comprises: a vertically movable body vertically movable relative to a connecting portion to which upper ends of the legs of the tripod assembly are pivotally coupled; and a collet portion fixed to an upper end of the vertically movable body and including a cup-shaped collet which is flexible and formed with a plurality of slits extending radially, and is characterized in that the collet receives a semispherical bowl leveler as making contact with a semispherical surface of the bowl leveler at a cup-shaped inside surface thereof, that the bowl leveler is combined with the collet portion by means of a bolt and is free to tilt back/forth and sideways as guided by the collet, that an upper end portion of the vertically movable body is provided with a collar at place outside the collet, the collar vertically movable relative to the vertically movable body, that the collar includes an abutment portion capable of being abutted against an outside surface of the collet, and that an upward movement of the collar brings the abutment portion into abutment against the outside surface of the collet for flexing the collet inwardly, while the collet is pressed against the semispherical surface of the bowl leveler at the inside surface thereof, thereby retainingly fixing the bowl leveler in a horizontal position.

In a second aspect according to the first aspect of the invention, a tripod assembly is characterized in that the collet portion includes a collet base which is coupled to the upper end portion of the vertically movable body, that the collet is disposed on an upper end of the collet base, that the collet base and the collet are each formed with a bolt hole, that the bolt hole formed in the collet has an inside diameter which is greater than an outside diameter of the bolt and is greater than an inside diameter of the bolt hole formed in the collet base, and that the bowl leveler is combined with the collet portion by means of the bolt through these bolt holes.

In a third aspect according to the first aspect of the invention, a tripod assembly is characterized in that a collet base is extended downward from a lower end of the collet and is integrally formed with the collet, that the collet is formed with a bolt hole having an inside diameter greater than an outside diameter of the bolt, and that the bowl leveler is combined with the collet portion by means of the bolt through the bolt hole.

According to the first aspect of the invention, the bowl leveler may be fixed in the horizontal position by manipulating the collar disposed at a lower end portion of the bowl leveler to which the imaging apparatus is mounted. The operation position to perform the operation for setting the imaging apparatus to the horizontal position is closely spaced from the position to perform the operation for fixing the bowl leveler, so that the leveling operation of the imaging apparatus is facilitated. The assembly does not require much time and effort for achieving the exact leveling. In addition, the structure for fixing the bowl leveler in position is simplified because the bowl leveler may be fixed in the horizontal position by manipulating the collet portion and the collar. This leads to cost reduction. Furthermore, the leveling operation of the imaging apparatus is facilitated because the bowl leveler is combined with the collet portion by means of the bolt so as to be able to tilt back/forth and sideways as guided by the collet, while a back/forth and sideways tiltable range of the imaging apparatus is limited to a desired extent. Hence, the leveling operation of the imaging apparatus is facilitated.

According to the second aspect of the invention, the tripod assembly offers the following effect in addition to that of the first aspect thereof. A back/forth and sideways tiltable range of the bowl leveler is limited to an extent that is defined by the bolt making contact with these bolt holes. Hence, the leveling operation of the imaging apparatus is facilitated.

According to the third aspect of the invention, the tripod assembly offers the following effect in addition to that of the first aspect thereof. The leveling operation of the imaging apparatus is facilitated because the collet base is integrally formed with the collet. In addition, the back/forth and sideways tiltable range of the bowl leveler is limited to an extent that is defined by the bolt making contact with the bolt hole, so that the leveling operation of the imaging apparatus is facilitated.

DETAILED DESCRIPTION OF THE INVENTION

Figure 1:
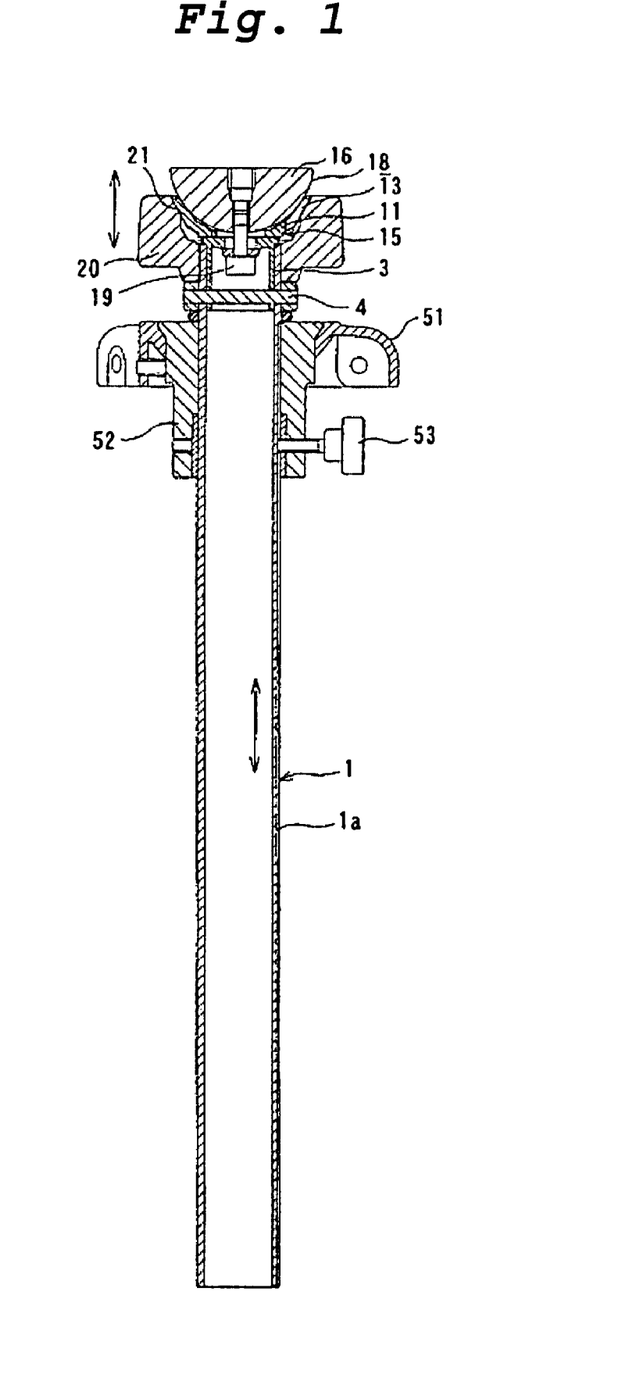
FIG. 1 is a sectional view showing a tripod assembly according to a first embodiment of the invention.

A tripod assembly shown in FIG. 1 is arranged such that a substantially cylindrical body 52 is connected to the center of a connecting portion 51 to which upper ends of the legs of the tripod assembly are pivotally coupled. A hollow cylindrical inner pipe 1a as a vertically movable body 1 is inserted through the body 52. The inner pipe 1a is vertically movable relative to the connecting portion 51. The body 52 is provided with a fixing screw 53 at an upper end thereof, the fixing screw attached orthogonally to a lengthwise direction of the body. The fixing screw 53 extends through the connecting portion 51 so as to make contact against an outside surface of the inner pipe 1a at a distal end thereof. The inner pipe 1a may be pulled up or down a predetermined length and fixed in position by tightening down the fixing screw 53 on the inner pipe.

A cap-shaped collet base 3 is coupled to an upper end portion of the inner pipe 1a by means of a parallel pin 4 and is secured thereto.

Figure 2:
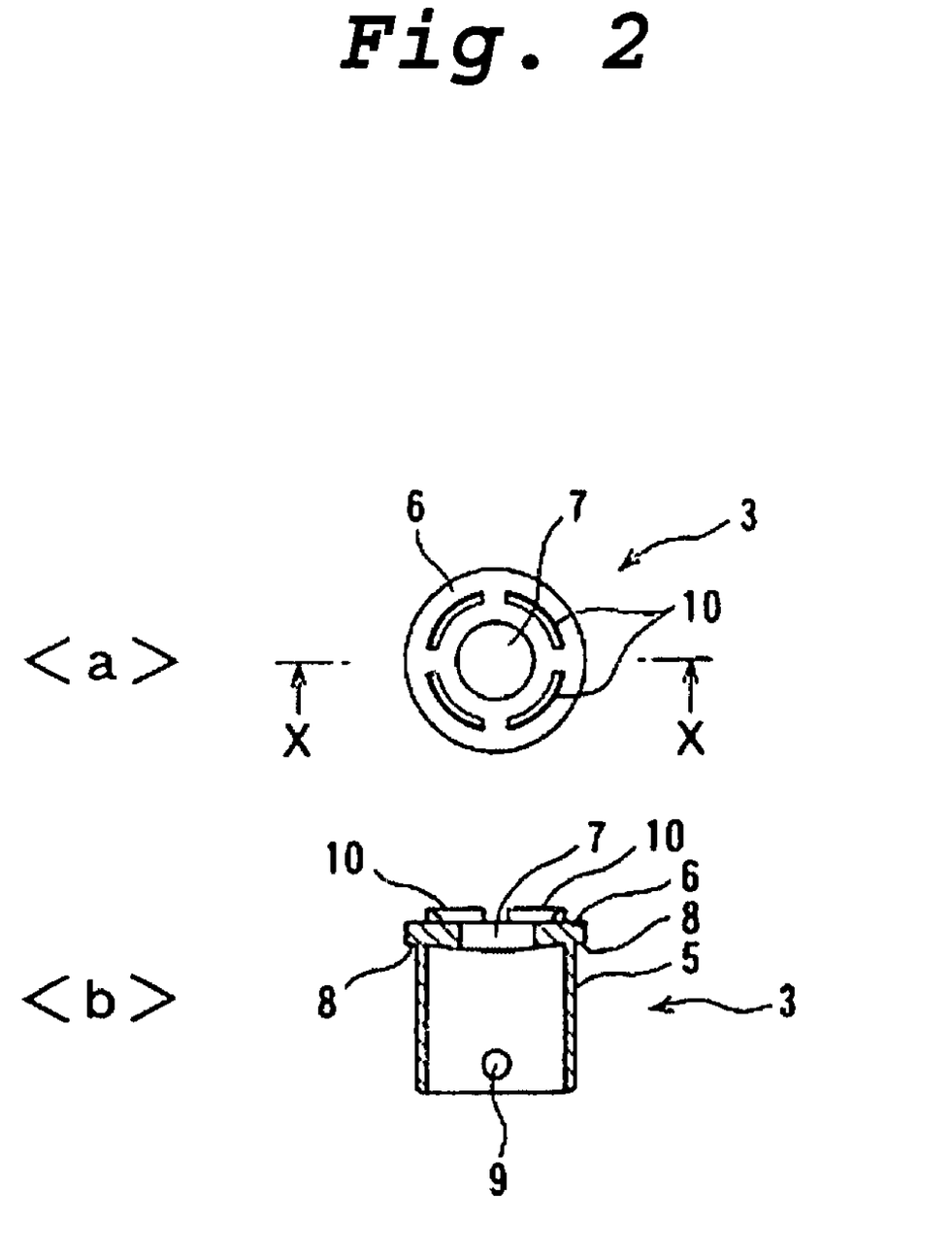
FIG. 2A and FIG. 2B are a plan view of a collet base shown in FIG. 1 and a sectional view thereof taken on the line X-X.

As shown in FIG. 2A and FIG. 2B, the collet base 3 comprises a cylindrical body 5, and a ring-like top surface portion 6 formed integrally with an upper end of the body 5. An outside diameter of the body 5 is smaller than an inside diameter of the inner pipe 1a shown in FIG. 1. The top surface portion 6 is centrally formed with a bolt hole 7 which vertically extends therethrough. An outside circumference portion of the top surface portion 6 has an outside diameter which is greater than that of the body 5 but is smaller than that of the inner pipe 1a. The outside circumference portion defines a flange 8. The collet base 3 is designed such that the top surface portion 6 is disposed on au upper end surface of the inner pipe 1a by inserting the body 5 into the inner pipe 1a. At this time, a lower side of the flange 8 of the top surface portion 6 overlaps with the upper end surface of the inner pipe 1a so that the collet base 3 may be stably seated on the upper end of the inner pipe 1a.

The body 5 is formed with two pin holes 9 which diametrically extend therethrough. The pin holes 9 are located in correspondence to pin holes diametrically extending through the upper end portion of the inner pipe 1a. The collet base 3 may be coupled to the upper end portion of the inner pipe 1a and secured thereto by taking the steps of: inserting the body 5 of the collet base 3 into the inner pipe 1a to seat the collet base 3 on the upper end of the inner pipe 1a; aligning the pin holes 9 with the pin holes of the inner pipe 1a; inserting the parallel pin 4 through one of the pin holes formed at the upper end portion of the inner pipe 1a and further inserting the pin through the pin hole 9 corresponding to the above pin hole, through the other pin hole 9 and through the pin hole of the inner pipe 1a which corresponds to the latter pin hole 9.

The top surface portion 6 is formed with arcuate ribs 10 projecting upward therefrom. The rib 10 is substantially shaped like a quarter circle. There are four ribs 10 arranged outwardly of the bolt hole 7 in a concentric relation.

As shown in FIG. 1, a collet 11 is disposed on an upper end of the collet base 3 shown in FIG. 2A and FIG. 2B.

Figure 3:
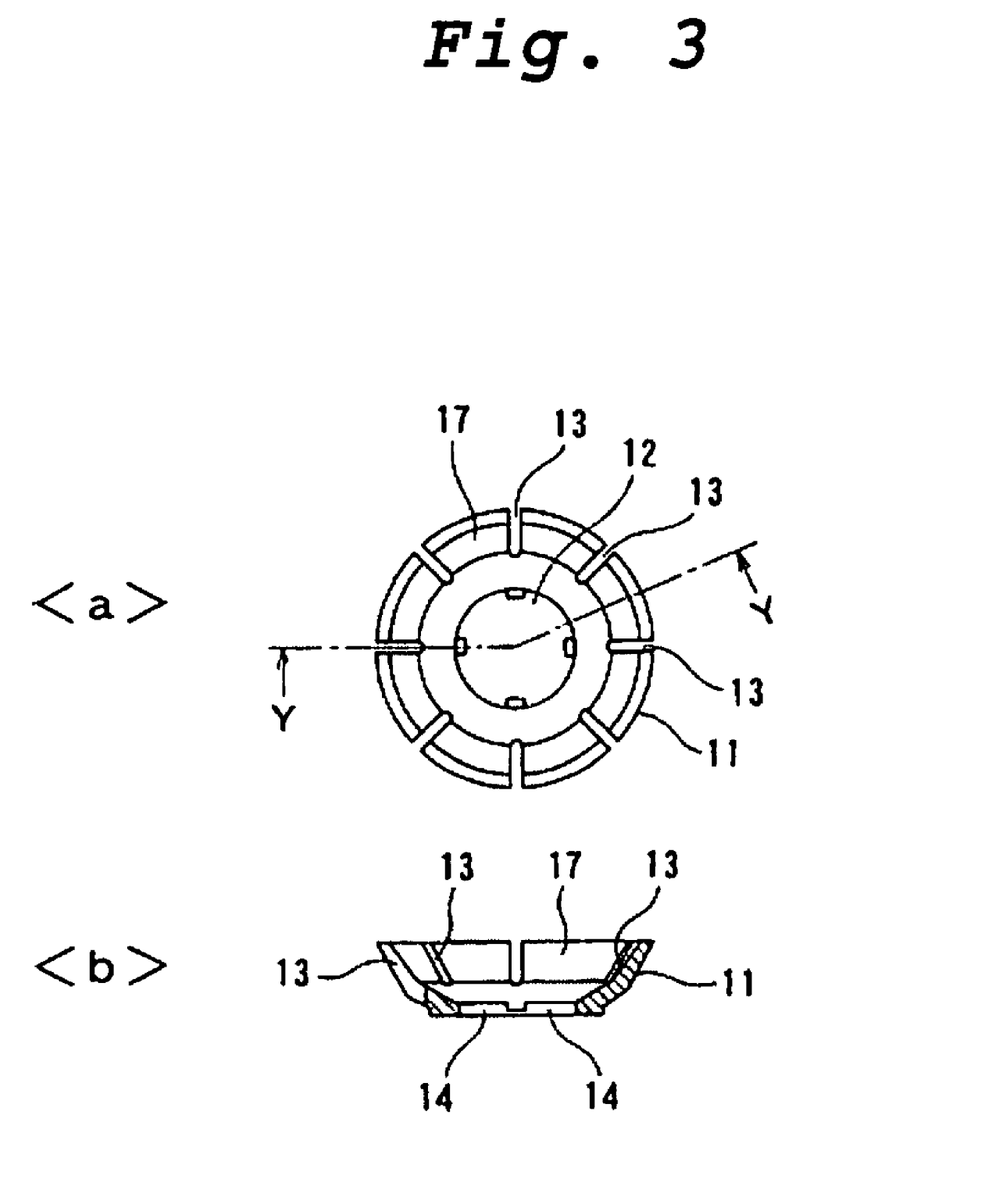
FIG. 3A and FIG. 3B are a plan view of the collet shown in FIG. 1 and a sectional view thereof taken on the line Y-Y.

As shown in FIG. 3A, 3B, the collet 11 is substantially shaped like a cup. A bolt hole 12 is formed at the center of a bottom of the collet 11 and has a greater inside diameter than that of the bolt hole 7 of the collet base 3 shown in FIG. 2A, FIG. 2B. Slits 13 are formed at places outside the bolt hole 12, as extending from a bottom side to an upper end of the collet. There are eight slits 13 extending radially and arranged at a space interval of 45° with respect to the center of the bolt hole 12. The collet 11 is flexible and may be formed from a lightweight metal such as aluminum or a resin.

The collet 11 is further formed with engaging grooves 14 at the bottom thereof. The engaging grooves are formed in an arcuate shape or substantially shaped like a quarter circle in correspondence to the ribs 10 of the collet base 3 shown in FIG. 2A, FIG. 2B. The ribs 10 of the collet base 3 may be inserted in the engaging grooves 14 so as to establish engagement therebetween, whereby the collet 11 with its bottom overlapped on an upper end face of the top surface portion 6 of the collet base 3 is stably retained on the upper end of the collet base 3. According to the tripod assembly shown in FIG. 1, the aforementioned collet 11 and collet base 3 constitute a collet portion 15.

As shown in FIG. 1, the collet 11 receives a semispherical bowl leveler 16, to which a fixing plate, camera platform or the like for mounting an imaging apparatus such as a video camera is connected. An inside surface 17 of the collet 11 shown in FIG. 3A, FIG. 3B is in contact with a spherical surface 18 of the bowl leveler 16. The bowl leveler 16 makes contact with the inside surface 17 of the collet 11 at the spherical surface 18 thereof, whereby the bowl leveler may be tilted back/forth or sideways as guided by the collet 11 so as to permit the leveling of the imaging apparatus.

The bowl leveler 16 is centrally formed with a screw hole which substantially extends from a midpoint of the thickness thereof to a bottom thereof. The bowl leveler 16 is combined with the collet base 3 and the collet 11 by threading a bolt 19 into this screw hole. Specifically, the bowl leveler 16 is combined with the collet 11 and the collet base 3 by taking the steps of: securely seating the collet 11 on the upper end of the collet base 3 as described above; inserting the bolt 19 from a lower end of the body 5 of the collet base 3; and threading the bolt 19 into the screw hole of the bowl leveler 16 via the bolt holes 7, 12 aligned with the screw hole. The inside diameter of the bolt hole 7 is greater than an outside diameter of the bolt 19, so that the bowl leveler 16, as guided by the collet 11, is allowed to tilt back/forth or sideways to an extent that is defined by the bolt 19 making contact with the bolt holes 7, 12. As described above, the collet 11 has its engaging grooves 14 engaged with the ribs 10 of the collet base 3 fixed to the upper end portion of the inner pipe 1a. Hence, the collet 11 is prevented from being rotated unitarily with the bowl leveler 16 when the bowl leveler is tilted. In the state where the bowl leveler 16 is combined with the collet 11 and the collet base 3 in a manner to be allowed to tilt relative to the collet 11, the collet base 3 is fixed to the upper end portion of the inner pipe 1a by means of the parallel pin 4, as described above.

As shown in FIG. 1, a ring-like collar 20 is mounted to the upper end portion of the inner pipe 1a in a manner to be vertically movable relative to the inner pipe 1a. The collar 20 is threaded at an inside surface thereof in a range from a substantial midpoint with respect to the thickness thereof to a lower end thereof, so that the collar may be meshed with a thread formed in the outside surface of the upper end portion of the inner pipe 1a and may be moved vertically relative to the inner pipe 1a by being rotated. The collar 20 is disposed at a lower end portion of the bowl leveler 16 combined with the collet 11 and the collet base 3.

An inside diameter of the collar 20 is progressively increased from the substantial midpoint with respect to the thickness thereof to an upper end thereof in correspondence to the outside diameter of the collet 11. The inside surface of the collar 20 is inclined at an upper end portion defined by a slant surface sloping toward outside, so that an abutment portion 21 is formed such as to be abutted against an outside surface of the collet 11.

The tripod assembly shown in FIG. 1 is manipulated as follows when the leveling of the imaging apparatus such as the video camera is performed. The three legs of the tripod assembly are so positioned as to permit the imaging apparatus to be positioned horizontally. Subsequently, the bowl leveler 16 is tilted back/forth or sideways so as to set the bowl leveler to the horizontal position by using a level vial or the like. The bowl leveler 16 has its semispherical surface 18 in contact with the inside surface 17 of the collet 11 so as to be guided by the collet 11. It is therefore easy to tiltably move the bowl lever and to set the bowl leveler to the horizontal position. After the imaging apparatus is set to the horizontal position, the collar 20 is rotatedly moved upward for bringing the abutment portion 21 into abutment against the outside surface of the collet 11, which, in turn, is pressed inwardly. The collet 11 is so deformed as to be reduced in the inside diameter because the collet is flexible and is formed with the slits 13. As a result, the inside surface 17 of the collet 11 is pressed against the semispherical surface 18 of the bowl leveler 16. The bowl leveler 16 is retained in position by way of the pressure contact, so as to be fixed in the horizontal position.

According to the tripod assembly shown in FIG. 1, the bowl leveler 16 may be fixed in the horizontal position by manipulating the collar 20 disposed at the lower end portion of the bowl leveler 16 on which the imaging apparatus is mounted. An operation position at which the operation is performed to set the imaging apparatus to the horizontal position is closely spaced from a position to perform a fixing operation of the bowl leveler 16 so that the leveling operation of the imaging apparatus is facilitated. The tripod assembly does not require much time and effort to achieve an exact leveling of the imaging apparatus because the bowl leveler 16 can be fixed in the horizontal position right after the imaging apparatus is set to the horizontal position. What is more, a structure for fixing the bowl leveler 16 in position is simplified because the fixing of the bowl leveler 16 in the horizontal position is achieved by using the collet portion 15 including the collet 11 and the collet base 3, and the collar 20. Therefore, the tripod assembly may be reduced in cost.

In addition, the collet 11 is mounted on the upper end of the collet base 3 by way of the engagement between the engaging grooves 14 thereof and the ribs 10 of the collet base 3 fixedly coupled to the upper end portion of the inner pipe 1a by means of the parallel pin 4. Thus, the collet 11 may be easily mounted to the upper end of the inner pipe 1a.

On the other hand, the bowl leveler 16 is combined with the collet portion 15 by means of the bolt 19 and is allowed to tilt back/forth or sideways as guided by the collet 11. Thus, a back/forth and sideways tiltable range of the imaging apparatus is limited to a desired extent. In other words, the back/forth and sideways tiltable range of the bowl leveler 16 is limited to the extent that is defined by the bolt 19 making contact with the bolt holes 7, 12. This facilitates the leveling operation of the imaging apparatus. If the tiltable range of the bowl leveler 16 is too large, it is difficult to accomplish the leveling of the imaging apparatus. Further, the imaging apparatus having a great weight may be inadvertently tilted. Such an inadvertent tilting motion of the imaging apparatus interferes with the leveling operation of the apparatus or may sometimes lead to a fear of drop off of the imaging apparatus. The tripod assembly shown in FIG. 1 obviates these problems, ensuring that the leveling of the imaging apparatus is accomplished reliably and easily.

Figure 4:
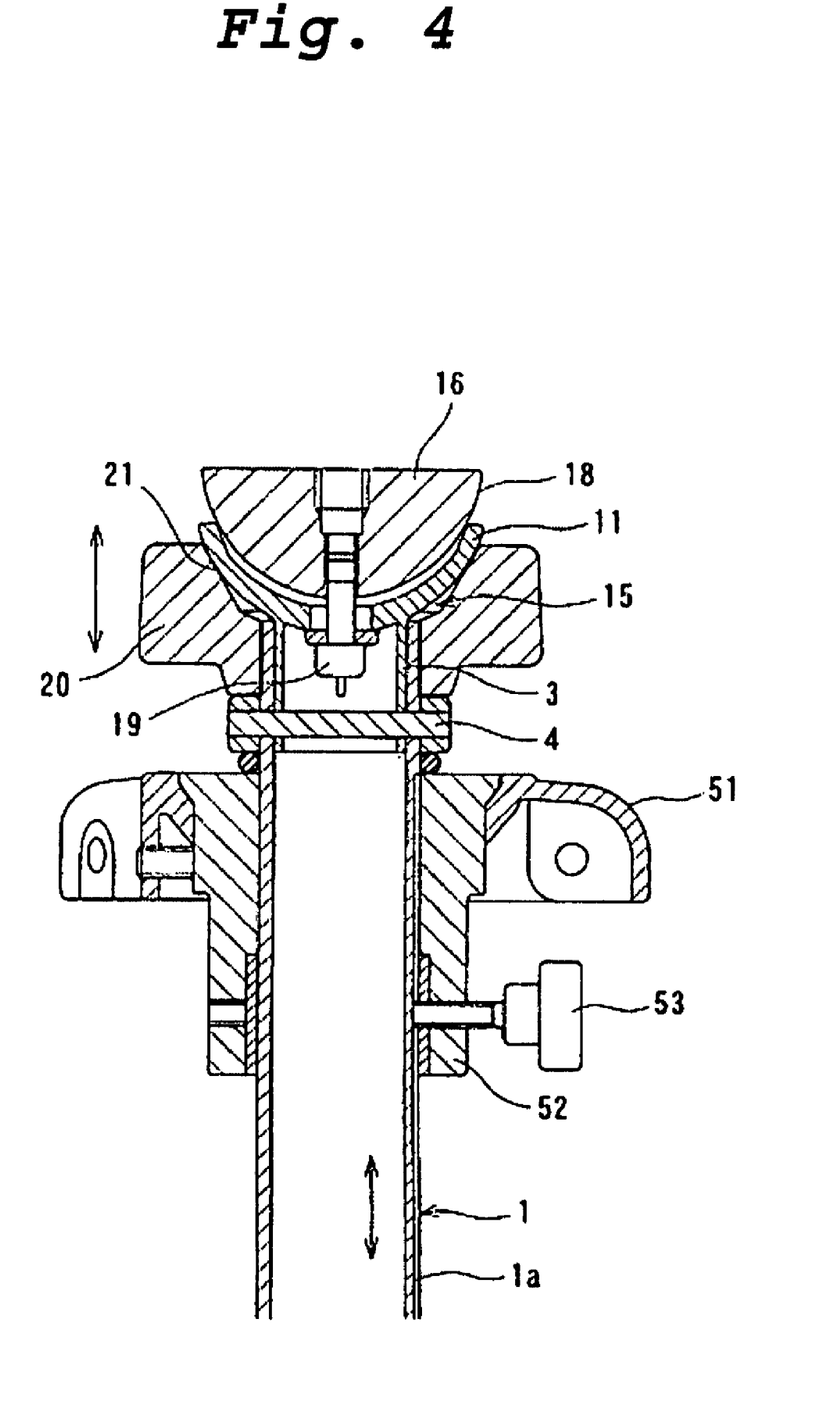
FIG. 4 is a sectional view showing a tripod assembly according to a second embodiment of the invention.

In a tripod assembly shown in FIG. 4, like reference characters refer to the corresponding parts of the tripod assembly shown in FIG. 1 and the description thereof is dispensed with.

In the tripod assembly shown in FIG. 4, the collet portion 15 differs from the collet portion 15 of the tripod assembly shown in FIG. 1. Although the collet portion 15 of the tripod assembly shown in FIG. 4 also comprises the collet 11 and the collet base 3, the collet 11 and the collet base 3 are not separate members but are formed in one piece.

Figure 5:
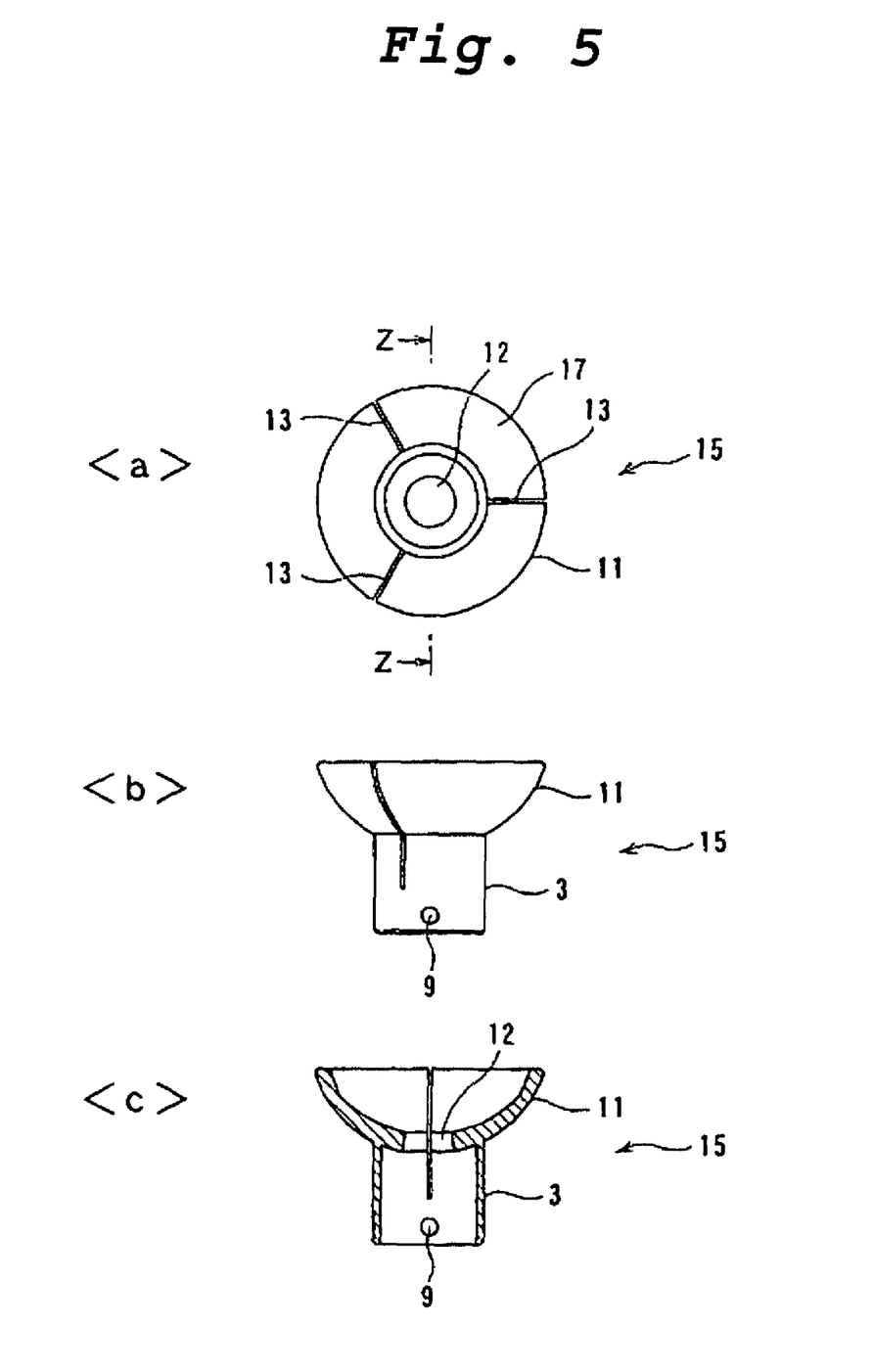
FIG. 5A, FIG. 5B and FIG. 5C are a plan view of a collet portion shown in FIG. 1, a side view thereof and a sectional view thereof taken on the line Z-Z.

As shown in FIG. 5A, FIG. 5B, FIG. 5C, the collet portion 15 is arranged such that the collet base 3 is extended from the lower end of the collet 11 and is integrally formed with the collet 11. The collet base 3 has a cylindrical shape and the top surface portion 6 shown in FIG. 2A, FIG. 2B is omitted. Therefore, the collet base 3 does not possess the ribs 10, whereas the collet 11 is not formed with the engaging grooves 14 shown in FIG. 3B. Only the bolt hole 12 is formed through the bottom of the collet 11, whereas the bolt hole 7 shown in FIG. 2A, FIG. 2B is omitted. The bowl leveler 16 is combined with the collet portion 15 by inserting the bolt 19 through the lower end of the collet base 3 and threading the bolt into the screw hole of the bowl leveler 16 via the bolt hole 12.

In the collet portion 15, the outside diameter of the collet base 3 is smaller than the inside diameter of the inner pipe 1a, so that the collet 11 may be mounted on the upper end of the inner pipe 1a by inserting the collet base 3 into the inner pipe 1a. Just as in the tripod assembly shown in FIG. 1, the collet portion 15 may be mounted on the upper end of the inner pipe 1a by taking the steps of: inserting the parallel pin 4 through one of the pin holes diametrically formed in the upper end portion of the inner pipe 1a and into one of the pin holes 9, shown in FIG. 5B, FIG. 5C, diametrically formed in the collet base 3, which is aligned with the above pin hole; and further inserting the parallel pin 4 through the other pin hole 9 and the pin hole aligned with this pin hole 9 and formed in the inner pipe 1a.

The collar 20 is rotatedly moved upward, so that the abutment portion 21 is brought into abutment against the outside surface of the collet 11. The collet 11 is flexed inwardly so that the inside surface 17 of the collet 11 is pressed against the semispherical surface 18 of the bowl leveler 16. Thus, the collet 11 retains and fixes the bowl leveler 16 in the horizontal position. That is, the same effect as that of the tripod assembly shown in FIG. 1 is provided.

In addition, the tripod assembly shown in FIG. 4 offers an easier mounting of the collet 11 on the upper end of the inner pipe 1a because the collet base 3 is integrally formed with the collet 11.

Furthermore, the back/forth and sideways tiltable range of the bowl leveler 16 is limited to the extent that is defined by the bolt 19 making contact with the bolt hole 12. This facilitates the leveling operation of the imaging apparatus.

As shown in FIG. 5A, the collet 11 is formed with three slots 13 which are arranged at a space interval of 120° with respect to the center of the bolt hole 12. The number and space interval of the slots 13 are not particularly limited so long as the collet 11 is formed with the plural slots radially extended.

Figure 6:
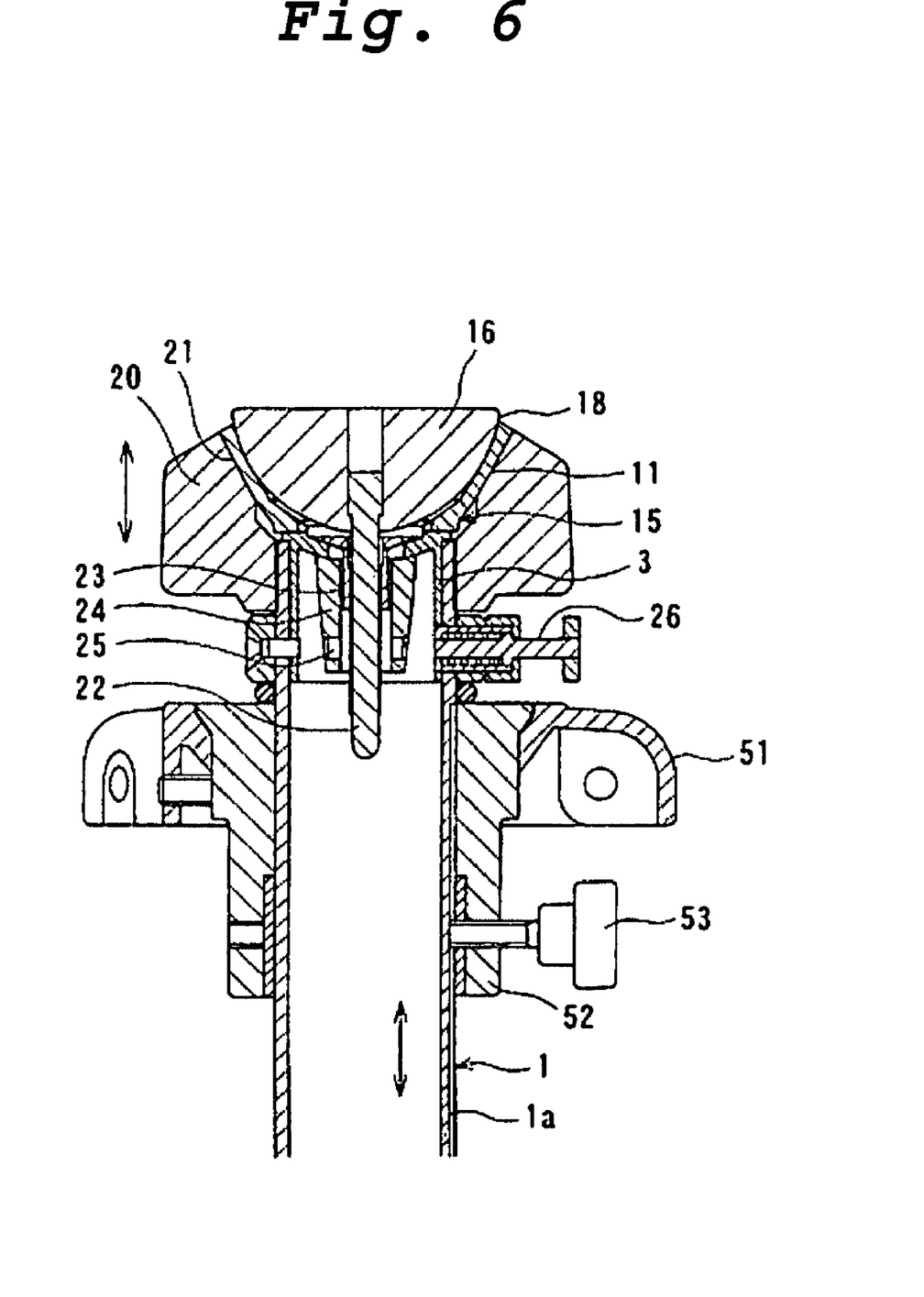
FIG. 6 is a vertical sectional view showing an essential part of a tripod assembly according to a third embodiment of the invention.

A tripod assembly shown in FIG. 6 is arranged such that the bowl leveler 16 having a bowl-leveler bolt 22 driven into the bottom thereof can be fixed in the horizontal position by means of the collet portion 15 and the collar 20. The basic arrangement of this assembly is the same as that of the tripod assembly shown in FIG. 1. Hence, like reference characters refer to the corresponding parts of the tripod assembly shown in FIG. 1 and the description thereof is dispensed with. For instance, the collet 11 and the collet base 3 constituting the collet portion 15 are separate members. The ribs 10 projecting upward from the top surface of the top surface portion 6 of the collet base 3 are engaged with the engaging grooves 14, whereby the collet 11 is retained on the upper end of the collet base 3.

According to the tripod assembly shown in FIG. 6, the collet base 3 is provided with a nut 23 extending downward from the bottom thereof and through the bolt hole 7. The collet base 3 is further provided with a nut 24 extending downward from a lower end face of the top surface portion 6 thereof. The nut 24 has an inside diameter which is greater than an outside diameter of the nut 23 and has an outside diameter which is smaller than the inside diameter of the inner pipe 1a. The nut 23 is externally threaded. Hence, the nut 23 and the nut 24 are secured to the collet base 3 by taking the steps of: inserting the nut 23 through the bolt hole 7 in the top surface portion 6 of the collet base 3 so as to project the nut 23 downward from the collet base 3; and screwing up the nut 24 meshed with a lower end of the nut 23. The nut 24 is formed with a pin fit drive 25 at the lower end thereof, which diametrically extends through the nut.

The upper end portion of the inner pipe 1a is diametrically movably provided with a check pin 26 at place corresponding to the pin fit drive 25 of the nut 24, the check pin also serving as the parallel pin 4 shown in FIG. 1.

Figure 7:
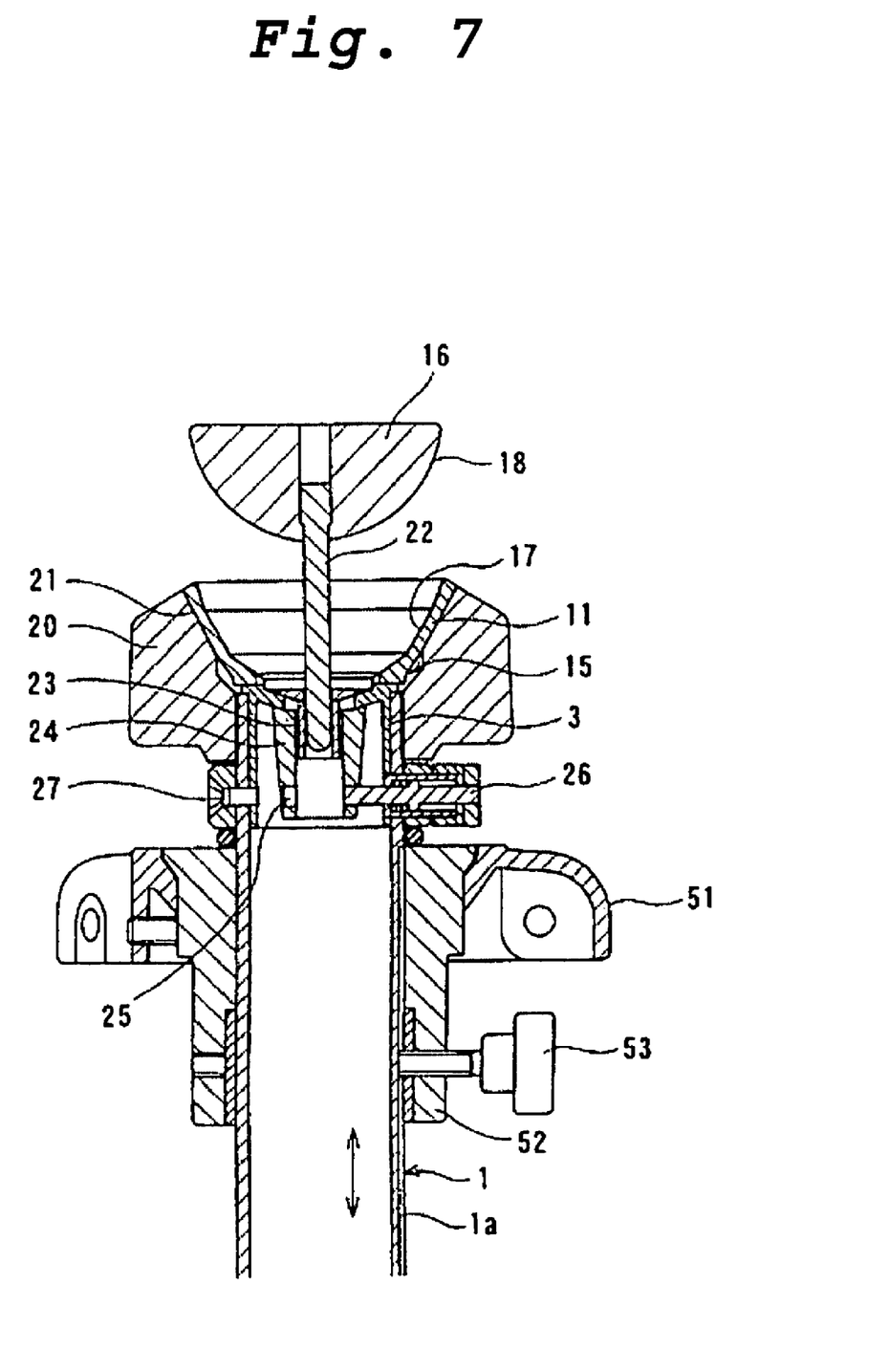
FIG. 7 is a vertical sectional view of the essential part of the tripod assembly shown in FIG. 6, showing how a bowl leveler is assembled.

In the tripod assembly shown in FIG. 6, the bowl leveler 16 may be assembled as follows. In a state where the collet portion 15 including the collet 11 and the collet base 3 is mounted to the upper end of the inner pipe 1a by means of the check pin 26 and a pin 27 disposed at the inner pipe 1a in correspondence to the check pin 26, as shown in FIG. 7, a distal end of the bowl-leveler bolt 22 is threaded into the nut 23. Subsequently, the check pin 26 is advanced toward the inner side of the inner pipe 1a so as to insert a distal end of the check pin into the pin fit drive 25 formed in the nut 24. The nut 24 is fixed in position by the check pin 26. Subsequently, the bowl-leveler bolt 22 is further threaded into the nut 23 till the semispherical surface 18 of the bowl leveler 16 is brought into contact with the inside surface 17 of the collet 11. Thereafter, the check pin 26 is retreated toward the outer side of the inner pipe 1a for releasing the nut 24 from the state fixed by the check pin 26. Thus is assembled the bowl leveler 16 having the bowl-leveler bolt 22 driven into the bottom thereof.

After assembly, the leveling of the imaging apparatus such as the video camera may be performed by tilting the bowl leveler 16 back/forth or sideways as guided by the collet 11.

Figure 8:
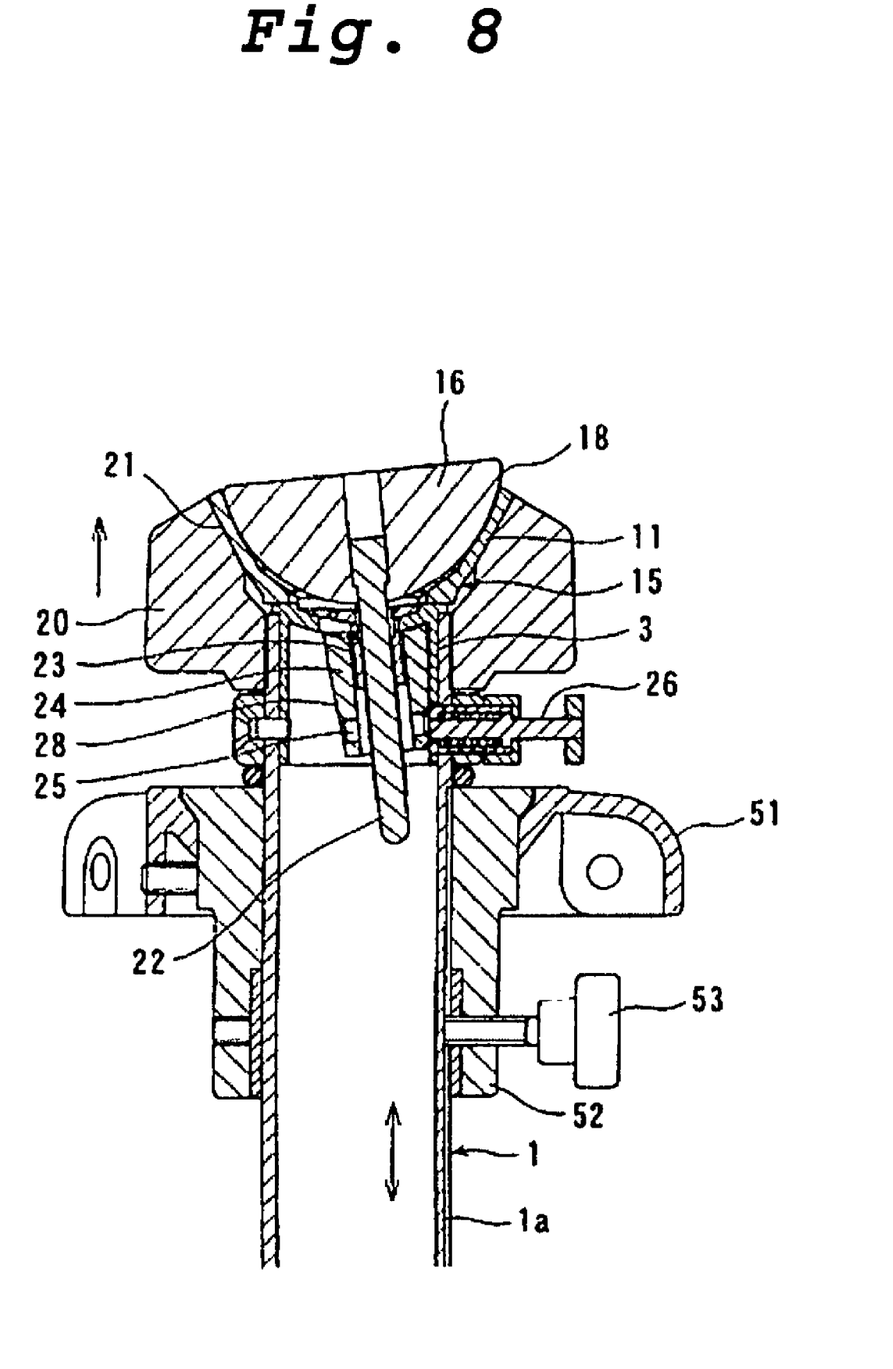
FIG. 8 is a vertical sectional view of the essential part, showing tiltable movement of the bowl leveler and fixing of the bowl leveler in a horizontal position by means of a collar.

Since the nut 24 has the outside diameter smaller than the inside diameter of the inner pipe 1a, the back/forth and sideways tilting motion of the bowl leveler 16 is allowed to the extent that is defined by an outside surface 28 of the nut making contact with an inside surface of the inner pipe 1a. In order to expand the tiltable range, the outside surface 28 of the bolt 24 may be defined by a conical surface progressively decreased in diameter from an upper end toward a lower end thereof, as shown in FIG. 6 to FIG. 8.

The bowl leveler 16 may be fixed in the horizontal position by rotatingly moving the collar 20 upward, just as in the tripod assembly shown in FIG. 1.

What is claimed is:

1. A tripod assembly comprising:
    a vertically movable body vertically movable relative to a connecting portion to which upper ends of legs of the tripod assembly are pivotally coupled; and
    a collet portion fixed to an upper end of the vertically movable body and including a cup-shaped collet which is flexible and formed with a plurality of slits extending radially,
    wherein the collet receives a semispherical bowl leveler, a cup-shaped inside surface of the collet making contact with a semispherical surface of the bowl leveler,
    wherein the bowl leveler is combined with the collet portion by a bolt and is free to tilt back/forth and sideways as guided by the collet,
    wherein an upper end portion of the vertically movable body is provided with a collar at a place outside the collet, the collar being vertically movable relative to the vertically movable body,
    wherein the collar includes an abutment portion on an inside surface thereof, the abutment portion being capable of being abutted against an outside surface of the collet, and
    wherein upward movement of the collar brings the abutment portion into abutment against the outside surface of the collet for flexing the collet inwardly, while the collet is pressed against the semispherical surface of the bowl leveler at the inside surface thereof, thereby retainingly fixing the bowl leveler in a horizontal position.

2. A tripod assembly according to claim 1, wherein the collet portion includes a collet base which is coupled to the upper end portion of the vertically movable body,
    wherein the collet is disposed on an upper end of the collet base,
    wherein the collet base and the collet are each formed with a bolt hole,
    wherein the bolt hole formed in the collet has an inside diameter which is greater than an outside diameter of the bolt and is greater than an inside diameter of the bolt hole formed in the collet base, and
    wherein the bowl leveler is combined with the collet portion by means of the bolt through these bolt holes.

3. A tripod assembly according to claim 1, wherein a collet base is extended downward from a lower end of the collet and is integrally formed with the collet,
    wherein the collet is formed with a bolt hole having an inside diameter greater than an outside diameter of the bolt, and
    wherein the bowl leveler is combined with the collet portion by means of the bolt through the bolt hole.

* * * * *